(12) United States Patent
Pruitt et al.

(10) Patent No.: US 11,725,825 B2
(45) Date of Patent: Aug. 15, 2023

(54) SYSTEM AND METHOD FOR USE OF PELLETIZED FUEL IN A KETTLE GRILL

(71) Applicant: Align Machine Works, LLC, Athens, GA (US)

(72) Inventors: Joseph Pruitt, Athens, GA (US); Jeffrey Broadrick, Athens, GA (US); Kyle Aasness, Athens, GA (US); Brandon Wells, Winterville, GA (US)

(73) Assignee: Spider Grills, LLC, Athens, GA (US)

( * ) Notice: Subject to any disclaimer, the term of this patent is extended or adjusted under 35 U.S.C. 154(b) by 0 days.

(21) Appl. No.: 16/935,065

(22) Filed: Jul. 21, 2020

(65) Prior Publication Data

US 2020/0348027 A1 Nov. 5, 2020

Related U.S. Application Data

(63) Continuation of application No. 16/246,152, filed on Jan. 11, 2019, now Pat. No. 10,876,733.

(60) Provisional application No. 62/729,751, filed on Sep. 11, 2018.

(51) Int. Cl.
| | |
|---|---|
| *F24B 13/04* | (2006.01) |
| *A47J 37/07* | (2006.01) |
| *A47J 37/06* | (2006.01) |

(52) U.S. Cl.
CPC .......... *F24B 13/04* (2013.01); *A47J 37/0786* (2013.01)

(58) Field of Classification Search
CPC .... A47J 37/0704; A47J 37/0786; F24B 13/04
See application file for complete search history.

(56) References Cited

U.S. PATENT DOCUMENTS

| | | | |
|---|---|---|---|
| 652,531 A * | 6/1900 | Carlson | A23B 4/052 |
| | | | 99/482 |
| 1,504,102 A | 8/1924 | Davis | |
| 3,131,685 A | 5/1964 | Bergfield | |
| 3,559,565 A | 2/1971 | Getz | |
| 3,611,915 A | 10/1971 | Glaser | |
| 4,416,248 A | 11/1983 | Schlosser | |
| 4,823,684 A | 4/1989 | Traeger et al. | |

(Continued)

FOREIGN PATENT DOCUMENTS

| | | |
|---|---|---|
| CA | 2634022 A1 | 7/2007 |
| CA | 2776929 A1 | 11/2013 |

(Continued)

*Primary Examiner* — Jorge A Pereiro
*Assistant Examiner* — Logan P Jones
(74) *Attorney, Agent, or Firm* — Smith Tempel Blaha LLC; Matthew T. Hoots

(57) ABSTRACT

Exemplary embodiments of a pelletized fuel delivery and combustion system are disclosed. Certain embodiments are configured to be detachably mounted to the exterior of a kettle-styled grill such as, but not limited to, a Weber® charcoal grill. When mounted to the kettle-styled grill, a firebox is external to the kettle and delivers thermal energy and smoke to the interior of the kettle by, and through, at least one damper port in the kettle. In this way, embodiments of the solution do not require significant, if any, modification to the kettle-styled grill in order for the kettle-styled grill to use a pelletized fuel source. Embodiments may also include temperature loop control and/or a thermal energy and smoke distribution plate configured to be set within the kettle of the grill.

7 Claims, 9 Drawing Sheets

(56) References Cited

U.S. PATENT DOCUMENTS

| | | | |
|---|---|---|---|
| 5,036,832 A | 8/1991 | Schlosser | |
| 5,104,080 A | 4/1992 | Berger | |
| 5,144,939 A | 9/1992 | Christopherson | |
| 5,251,607 A | 10/1993 | Traeger et al. | |
| 5,865,099 A * | 2/1999 | Waugh | A47J 37/0704 126/41 R |
| 7,159,509 B2 | 1/2007 | Starkey | |
| 7,530,351 B2 | 5/2009 | Leverty | |
| 7,900,553 B1 | 3/2011 | Maurin | |
| 8,267,078 B2 | 9/2012 | Kuntz | |
| 8,662,068 B2 | 3/2014 | Ahmed | |
| 9,140,448 B2 | 9/2015 | Freeman | |
| 9,186,020 B1 | 11/2015 | Phillips | |
| 9,585,518 B1 | 3/2017 | Phillips | |
| 9,693,569 B2 | 7/2017 | Wingerd et al. | |
| 9,814,354 B2 | 11/2017 | McAdams et al. | |
| 9,913,559 B2 | 3/2018 | Polter et al. | |
| 10,092,135 B2 | 10/2018 | DeBruler | |
| 10,105,007 B2 | 10/2018 | Colston | |
| 10,436,439 B1 | 10/2019 | Fraeger | |
| 10,670,276 B2 | 6/2020 | Fraeger | |
| 2003/0226561 A1 | 12/2003 | Darbonne | |
| 2004/0211406 A1* | 10/2004 | Cornfield | A47J 37/067 126/274 |
| 2004/0226550 A1 | 11/2004 | Hutton | |
| 2009/0293860 A1 | 12/2009 | Carlson | |
| 2010/0095946 A1 | 4/2010 | Creel | |
| 2010/0218754 A1* | 9/2010 | Kuntz | A47J 37/0786 126/25 R |
| 2013/0067805 A1 | 3/2013 | Geffen | |
| 2013/0174834 A1 | 7/2013 | Measom et al. | |
| 2013/0206015 A1* | 8/2013 | Jacoby | A47J 37/07 99/330 |
| 2013/0206850 A1 | 8/2013 | Erickson | |
| 2013/0255546 A1* | 10/2013 | Jones | F23G 7/105 110/186 |
| 2013/0298894 A1* | 11/2013 | Kleinsasser | A47J 37/0704 126/25 R |
| 2013/0327259 A1* | 12/2013 | Freeman | F24B 13/04 110/286 |
| 2014/0326233 A1 | 11/2014 | Traeger | |
| 2015/0320259 A1* | 11/2015 | Tucker | A47J 37/0786 126/25 R |
| 2017/0065124 A1 | 3/2017 | Colston | |
| 2018/0263415 A1 | 9/2018 | Hackley | |
| 2018/0325314 A1* | 11/2018 | Walters | A47J 37/0786 |
| 2018/0368618 A1 | 12/2018 | Measom et al. | |
| 2019/0008321 A1 | 1/2019 | Allmendinger | |
| 2020/0046163 A1* | 2/2020 | Yang | A47J 36/04 |

FOREIGN PATENT DOCUMENTS

| | | | |
|---|---|---|---|
| CN | 202035428 U | 11/2011 | |
| CN | 203407929 U | 1/2014 | |
| CN | 207152494 U | 3/2018 | |
| DE | 202007007223 U1 | 8/2007 | |
| DE | 202012100411 U1 | 3/2012 | |
| DE | 102013100970 B4 | 8/2014 | |
| EP | 2698580 B1 | 10/2015 | |
| EP | 2967255 B1 | 1/2016 | |
| EP | 3372127 A1 | 9/2018 | |
| GB | 2505922 A | 3/2014 | |
| JP | 3218622 U | 10/2018 | |
| KR | 100869071 B1 | 11/2008 | |
| KR | 20110003624 U | 4/2011 | |
| KR | 101141228 B1 | 5/2012 | |
| KR | 101484910 B1 | 1/2015 | |
| KR | 101529676 B1 | 6/2015 | |
| KR | 101635714 B1 | 7/2016 | |
| KR | 20180067458 A | 6/2018 | |
| KR | 101884137 B1 | 7/2018 | |
| WO | 2013116946 A1 | 8/2013 | |
| WO | WO-2013116946 A1 * | 8/2013 | A47J 37/0704 |
| WO | 2016097338 A1 | 6/2016 | |
| WO | 2016124639 A1 | 8/2016 | |
| WO | 2017044619 A1 | 3/2017 | |
| WO | 2017069813 A9 | 7/2017 | |
| WO | 2018204265 A1 | 11/2018 | |

* cited by examiner

SYSTEM AND METHOD FOR USE OF PELLETIZED FUEL IN A KETTLE GRILL

BACKGROUND

The present invention relates to outdoor grilling and smoking solutions and, more particularly, to a novel system for enabling use of a pelletized fuel source in a kettle-styled grill designed for use with charcoal.

Advantageously, grilling or smoking food with a wood fuel source imparts desirable flavor to the food. Consequently, cooking with a pelletized wood fuel source, as opposed to a gas fuel source or charcoal briquette fuel source, has become popular with outdoor grilling enthusiasts over the past two decades. Outdoor grilling and smoking systems designed for use with pelletized wood fuel, however, are relatively expensive compared to other grilling systems and are limited to use of only a pelletized fuel. By contrast, kettle-styled grills designed for use with a charcoal briquette fuel source, such as a typical Weber® grill as would be recognized in the art, are relatively inexpensive and ubiquitous. It is envisioned that owners of kettle-styled grills may desire to have the option of using a pelletized fuel source in their grill in lieu of charcoal briquettes.

Therefore, there is a need in the art for a system and method for use of pelletized fuel in a kettle-styled charcoal grill. More specifically, there is a need in the art for a system configured for removable attachment to a kettle-styled grill such that the kettle-styled grill may be used with either a charcoal briquette fuel source or a pelletized fuel source, at the option of the user.

SUMMARY

Exemplary embodiments of a pelletized fuel delivery and combustion system are disclosed. Certain embodiments are configured to be detachably mounted to the exterior of a kettle-styled grill such as, but not limited to, a Weber® charcoal grill. When mounted to the kettle-styled grill, a firebox is external to the kettle and delivers thermal energy and smoke to the interior of the kettle by, and through, at least one damper port in the kettle. In this way, embodiments of the solution do not require significant, if any, modification to the kettle-styled grill in order for the kettle-styled grill to use a pelletized fuel source. Embodiments may also include temperature loop control and/or a thermal energy and smoke distribution plate configured to be set within the kettle of the grill.

An exemplary embodiment of a pelletized fuel delivery and combustion system according to the solution comprises 1) a firebox configured for combustion of a pelletized fuel, 2) a pelletized fuel delivery subsystem in communication with the firebox and operable to deliver pelletized fuel to the firebox at a controlled rate, 3) a heating element in communication with the firebox such that the heating element is operable to ignite pelletized fuel in the firebox, 4) a hopper configured to store pelletized fuel and deliver pelletized fuel to the pelletized fuel delivery subsystem, 5) an attachment mechanism for releasably mating the pelletized fuel delivery and combustion system to the exterior of a grill kettle, 6) a flue component in communication with the firebox, wherein when the pelletized fuel delivery and combustion system is mated to the grill kettle the flue component is configured to interface with at least one damper hole in the bottom of the grill kettle, 7) a temperature sensor in electrical communication with an electronic controller configured to vary a rate of pelletized fuel delivery by the pelletized fuel delivery subsystem, 8) a smoke and thermal energy distribution plate configured to reside within the interior of grill kettle, wherein when the smoke and thermal energy distribution plate is placed in the interior of the grill kettle a space is defined beneath the smoke and thermal energy distribution plate and the flue component, and 9) an adjustable foot component configured to adjust a height of the system. Specifically regarding the smoke and thermal energy distribution plate of the exemplary embodiment, the plate may include one or more of, but not limited to including one or more of, a foot component for stabilization, a slanted bottom surface and a byproduct drain located at a lower end of the slanted bottom surface (the byproduct drain may be configured to interface with at least one damper hole in the bottom of the grill kettle for expelling byproduct of the cooking process), and a rim having a series of slits or ports positioned for distributing smoke from the space beneath the smoke and thermal energy distribution plate.

In another exemplary embodiment of a pelletized fuel delivery and combustion system according to the solution, the system comprises means for storing a pelletized fuel, means for igniting and combusting the pelletized fuel, means for delivering the pelletized fuel at a controlled rate from the means for storing the pelletized fuel to the means for igniting and combusting, means for releasably mating the system to the exterior of a grill kettle, and means for interfacing the system with at least one damper hole in the bottom of the grill kettle such that thermal energy and smoke generated by the means for igniting and combusting emanates into the grill kettle. The exemplary embodiment may further include means for varying a rate of pelletized fuel delivery based on a temperature measurement, such means optionally including a proportional-integral-derivative control algorithm. The means for delivering a pelletized fuel may include an auger, belt, agitator or the like. The exemplary embodiment may further include means for defining a space in the interior of the grill kettle for receipt of thermal energy and smoke generated by the system, such means may include, but is not limited to including, at least one foot component for stabilization, a means for capturing cooking byproduct and a means for draining the byproduct from the grill kettle, and a plurality of slits positioned for distributing smoke from the space. The means for draining the byproduct from the grill kettle may interface with at least one damper hole in the bottom of the grill kettle. The exemplary embodiment may further include means for adjusting a height of the system.

DETAILED DESCRIPTION

Various embodiments, aspects and features of the present invention encompass a system and method for use of a pelletized fuel (e.g., wood pellets) in a kettle-styled grill (e.g., a Weber® grill designed for use with a briquette charcoal fuel). As one of ordinary skill in the art would understand and recognize, kettle-styled grills are intended for use with charcoal. When used as intended, charcoal is placed in the kettle of the grill and ignited. A cooking grate is suspended over the top of the charcoal. Thermal energy generated by the charcoal radiates upward toward the grate and cooks any food item placed thereon. To control temperature and rate of burn, kettle-styled charcoal grills usually include a somewhat crude, manual damper-type control. Some kettle-styled grills incorporate the damper on the top of a lid that mates to and over the lower kettle. Other kettle-styled grills, however, such as what is commonly known as a Weber® branded grill, incorporate a damper at the bottom of the kettle (often in addition to a damper on the lid of the kettle), thereby providing means for control of air directly to, and through, the charcoal.

One of ordinary skill in the art would understand that wood pellets, as a fuel source, cannot simply be mounded in the bottom of a kettle-style grill in lieu of charcoal. A wood pellet fuel source requires controlled delivery of the wood pellets in order to efficiently combust the wood pellets and manage thermal energy generation and smoke generation. Advantageously, embodiments of the solution are configured to detachably integrate to a kettle-styled grill having a damper at the bottom of the kettle. As will be better understood from the attached figures and the following description, at least one damper hole (there are commonly three damper holes in a typical Weber® grill) is leveraged to deliver thermal energy (i.e., heat) and smoke from a firebox advantageously positioned outside and beneath the kettle.

Figure 1:
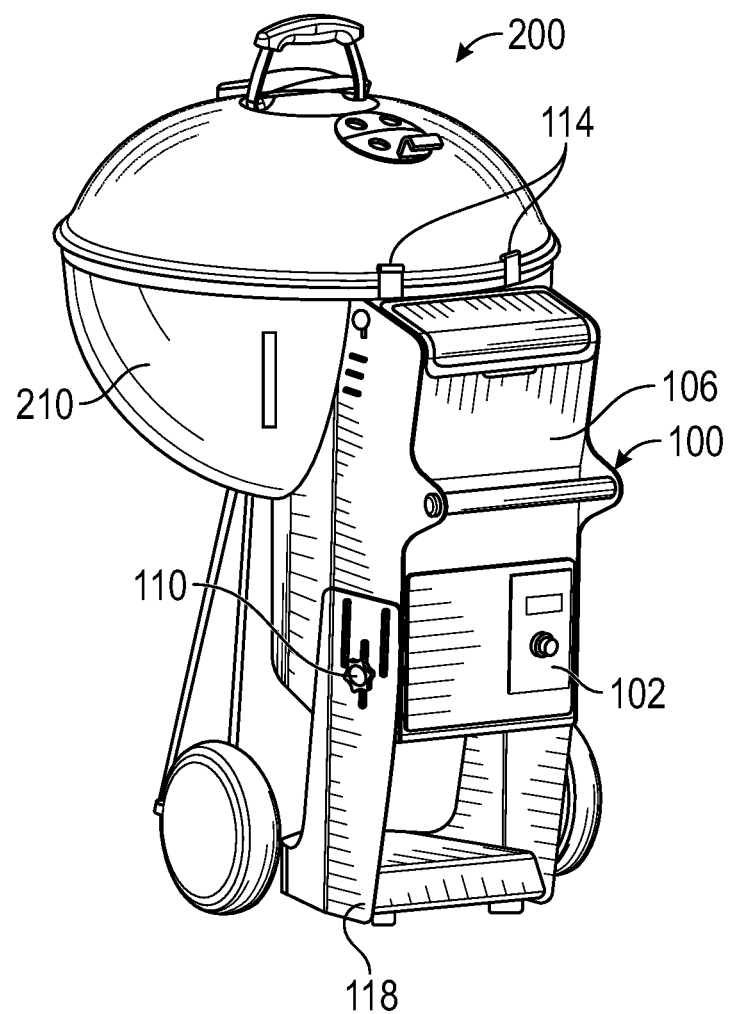
FIG. 1 illustrates an exemplary embodiment of a pelletized fuel delivery and combustion system according to the solution, shown mounted to a kettle-styled charcoal grill.

FIG. 1 illustrates an exemplary embodiment of a pelletized fuel delivery and combustion system 100 according to the solution, shown mounted to a kettle-styled charcoal grill 200. As can be understood from the FIG. 1 illustration, the pelletized fuel delivery and combustion system 100 is juxtaposed to the kettle 210 of the grill 200 such that the system 100 is positioned beneath and to the side of the kettle 210. The pelletized fuel delivery and combustion system 100 may be detachably mated to the kettle 210 via adjustable hooks 114 that are configured to engage the lip of the kettle 210. In order to accommodate different kettle-styled grills which may differ in height, the pelletized fuel delivery and combustion system 100 may also include a foot 118 that is adjustable vertically and/or horizontally (relative to the ground) via an adjustment mechanism such as exemplary mechanism 110.

As will become more apparent from subsequent figures, the pelletized fuel delivery and combustion system 100 may deliver thermal energy and smoke into the interior of the kettle 210 via one or more damper ports in the bottom of kettle 210. It is envisioned that kettle-styled grills not including damper ports in the bottom of their respective kettles may be modified to include one or more ports suitable for receiving and interfacing with a pelletized fuel delivery and combustion system 100 and, as such, it should be understood that embodiments of a pelletized fuel delivery and combustion system 100 are not limited to integration with those specific brands or styles of kettle-styled grills having manual damper ports in the bottom of the kettle.

Returning to the FIG. 1 illustration, and as will become clearer from a review of subsequent figures and the related description, a temperature feedback loop includes a sensor 104 (not shown in the FIG. 1 illustration) that may be placed on the cooking grate 300 (not shown in the FIG. 1 illustration) of the grill 200. Moreover, although the exemplary embodiments shown and described in the present disclosure include a single temperature sensor, it is envisioned that embodiments of the solution may leverage temperature sensor feedback from multiple temperature sensors positioned in multiple locations.

As would be understood by one of ordinary skill in the art of grilling/smoking with a pelletized fuel, the temperature sensor provides feedback to a controller 102 that, in turn, controls actuation of a pelletized fuel delivery subsystem that includes a motor-driven auger or other pellet delivery mechanism. By controlling the speed of pellet delivery to a firebox, the controller may cause a cooking temperature to be maintained at a desired temperature setting. The temperature setting determined by a user informs the controller in view of the temperature sensor signal to vary the speed of the fan and auger motor. The controller may leverage a proportional-integral-derivative ("PID") control algorithm, as would be understood by one of ordinary skill in the art of process control. The auger motor causes rotation of an auger that functions to deliver wood pellets from a hopper 106 to the firebox (not shown in the FIG. 1 illustration). A heating element in communication with the firebox causes ignition of the wood pellets in the firebox. As will become better understood from subsequent figures, wood pellets combusted in the firebox generate heat and smoke that are delivered through a flue component configured to interface with at least one damper hole in the bottom of the grill kettle.

Advantageously, when not in use, embodiments of the solution may be detached from the kettle grill 200. Referring specifically to the exemplary pelletized fuel system 100, a height adjustment mechanism 110 provides for the ability to lower the foot 118 of the system 100 to contact the ground and stabilize the grill 200 when the system 100 is attached thereto. Moreover, a pair of releasable hooks 114 are configured and positioned to cantilever the system 100 from the lip of the grill kettle 210, as previously described. By tightening the hooks 114 down and lowering the foot 118 to contact the ground when the system 100 is mated to the grill kettle 210, the overall grill 200 and system 100 combination may be stabilized from tipping. Other means to attachment and stabilization will occur to those of skill in the art and, as such, the scope of the solution disclosed herein is not in any way limited by the specific means of attachment and detachment shown.

Figure 2:
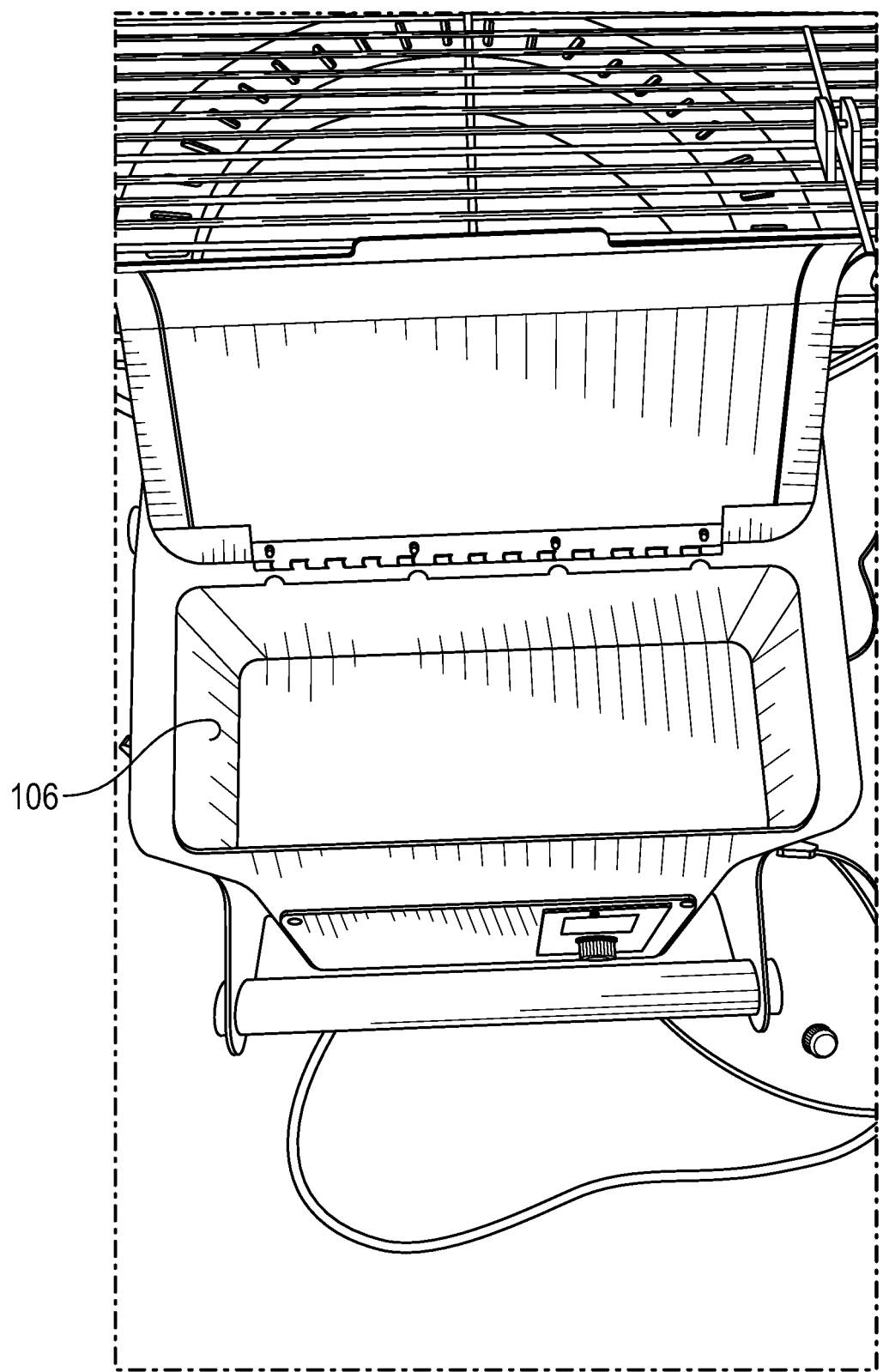
FIG. 2 is a top-side view of the exemplary embodiment shown in FIG. 1 with the pellet storage hopper open.

FIG. 2 is a top-side view of the exemplary embodiment 100 shown in FIG. 1 with the pellet storage hopper 106 open. As can be understood from the FIG. 2 illustration, the hopper 106 may be filled with wood pellets such as, but not limited to, oak wood pellets, apple wood pellets, etc. In the FIG. 2 illustration, no pelletized fuel is depicted as being stored in the hopper 106, i.e. the hopper 106 is empty for illustrative purposes.

The pelletized fuel may be delivered at a controlled rate, or a varied rate, to the firebox (not shown in FIG. 2) from the hopper 106 via the motor-driven auger (not shown in FIG. 2). The shape and nature of the exemplary hopper 106, and its interaction with the pelletized fuel delivery subsystem, will become more apparent from subsequent figures and their related description.

In the exemplary embodiment of a pelletized fuel delivery and combustion system 100 offered in this disclosure, the hopper 106 is a single, large hopper, although it is envisioned that other embodiments of the solution may include multiple hoppers or a hopper subdivided into multiple compartments. For such embodiments, multiple different pelletized fuels may be simultaneously stored in the system, thereby reducing the need to remove one pelletized fuel from the hopper in order to use a different type of pelletized fuel. It is also envisioned that embodiments of the solution that leverage multiple hoppers or a hopper subdivided into multiple compartments may be configured to deliver proportioned supplies of multiple pelletized fuels to the firebox in order to customize flavor profiles generated by smoke from the multiple fuels. For such an embodiment, the controller may be configured to control a pelletized fuel delivery subsystem comprised of multiple augers or, alternatively, openings from multiple "chutes" feeding a single auger.

Figure 3:
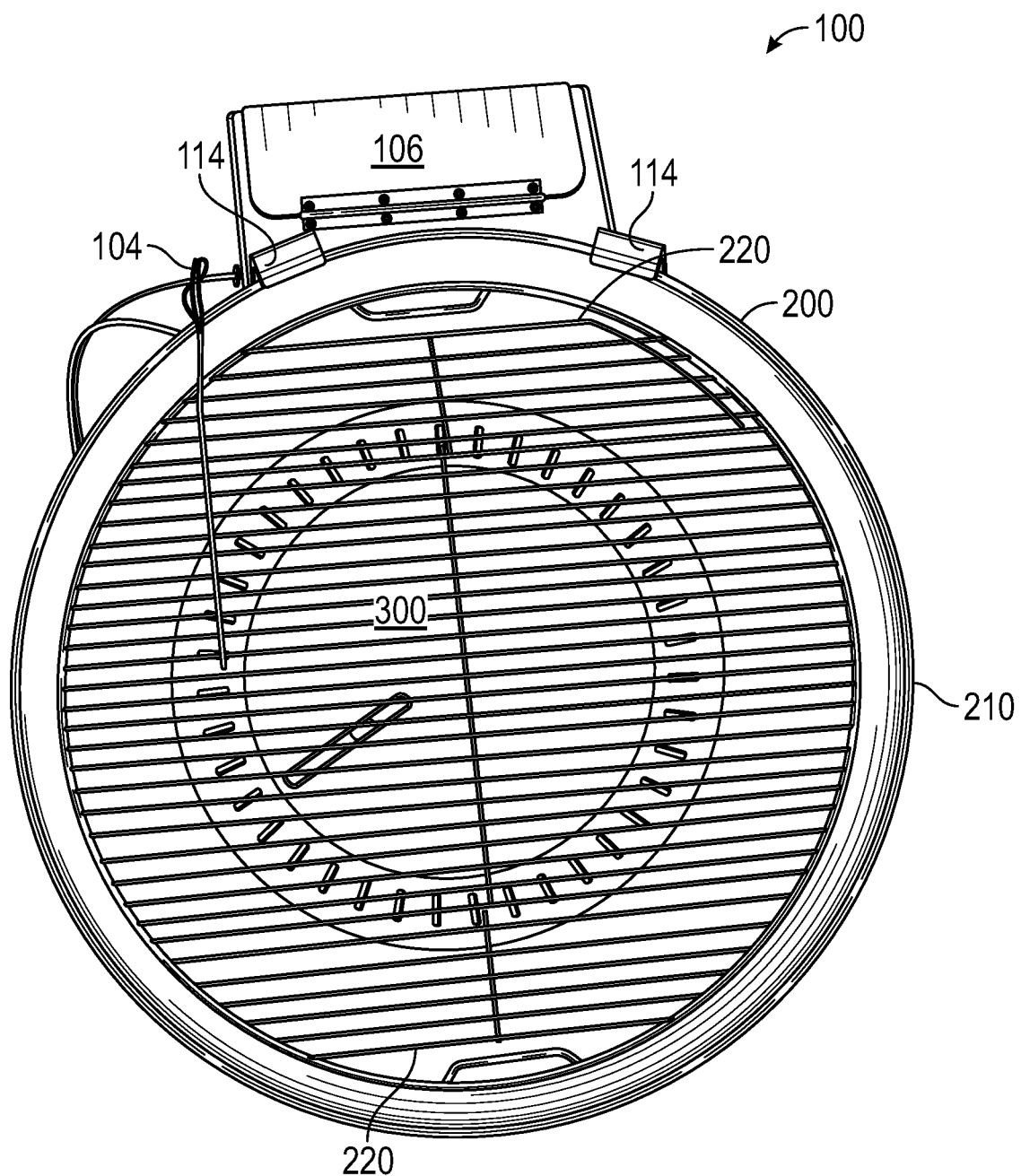
FIG. 3 is a top-side view of the exemplary embodiment shown in FIG. 1 wherein a smoke and thermal energy distribution plate can be seen installed within the kettle-styled grill beneath the cooking grate.
Figure 4:
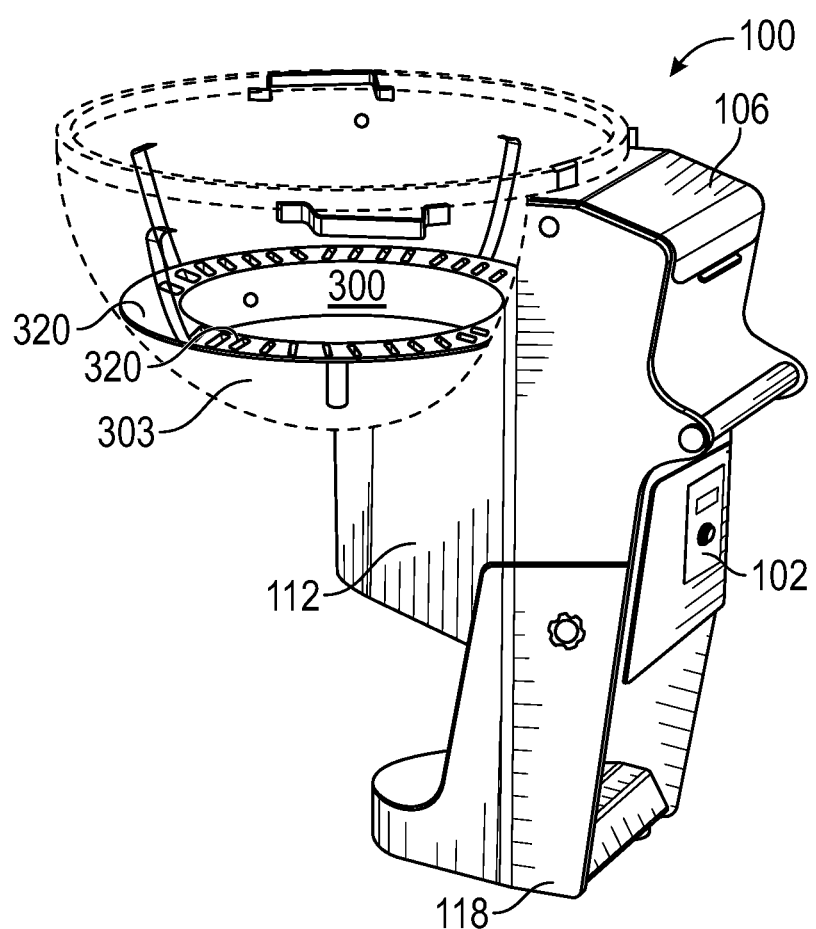
FIG. 4 is an additional view of the exemplary embodiment shown in FIG. 1, illustrated with the kettle-styled grill transparently depicted with dashed lines.

FIG. 3 is a top-side view of the exemplary embodiment 100 shown in FIG. 1 wherein a smoke and thermal energy distribution plate 300 can be seen installed within the kettle 210 of kettle-styled grill 200 beneath the cooking grate 220. FIG. 4, which will be described in conjunction with the description of the FIG. 3 illustration, depicts the kettle 210 of the kettle-styled grill transparently with dashed lines such that the positioning and purpose of the smoke and thermal energy distribution plate 300 can be better understood. Details of the smoke and thermal energy distribution plate 300 will be shown and described relative to FIGS. 8-10.

Returning to the FIG. 3 and FIG. 4 illustrations, the smoke and thermal energy distribution plate 300 may be configured to seat within the kettle 210 such that a space 303 is defined within the kettle 210 and beneath the smoke and thermal energy distribution plate 300. The system 100 may deliver smoke and thermal energy into the space 303. In turn, the plate 300 may receive thermal energy delivered into space 303 and distribute it evenly upward to the cooking surface of grill 200 via conduction and radiation, as would be understood by one of ordinary skill in the art of thermodynamics. Advantageously, smoke generated by the system 100 combusting pelletized fuel may also build up in space 303 and, subsequently, be distributed in an even manner up to a cooking surface via smoke distribution lip 320 which may include a plurality of slits or ports by and through which smoke may rise up and out of space 303.

Figure 5:
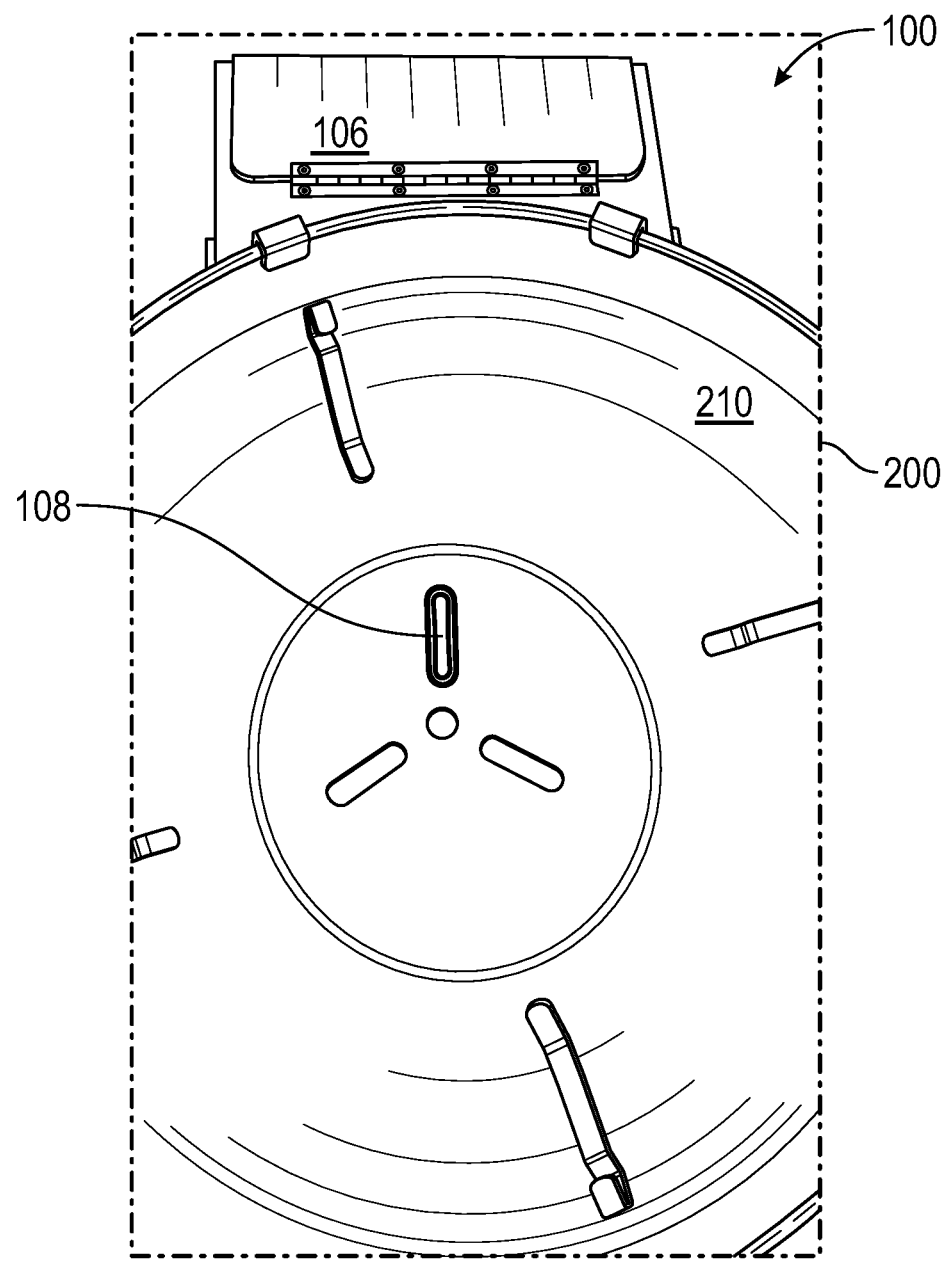
FIG. 5 is another top-side view of the exemplary embodiment shown in FIG. 1 wherein the grilling grate as well as the smoke and thermal energy distribution plate illustrated in FIG. 4 have been removed to reveal the interior bottom of the kettle-styled grill.

FIG. 5 is another top-side view of the exemplary embodiment shown in FIG. 1 wherein the grilling grate 220 as well as the smoke and thermal energy distribution plate 300, illustrated in the FIG. 3 and FIG. 4 drawings, have been removed to reveal the interior bottom of the kettle 210 of the kettle-styled grill 200. As can be seen from this illustration, the flue component 108 (as will be described in more detail relative to FIGS. 6-7) mechanically mates with, and through, a damper port in the bottom of the kettle 210 when the system 100 is mechanically mated to the grill 200. It is through the flue component 108 that thermal energy and smoke is delivered into the space 303 depicted in FIG. 4. It is an advantage of embodiments of the solution that the pelletized fuel may be combusted in a firebox that is external to the kettle 210 and then delivered into the kettle 210 through a damper port.

Figure 6:
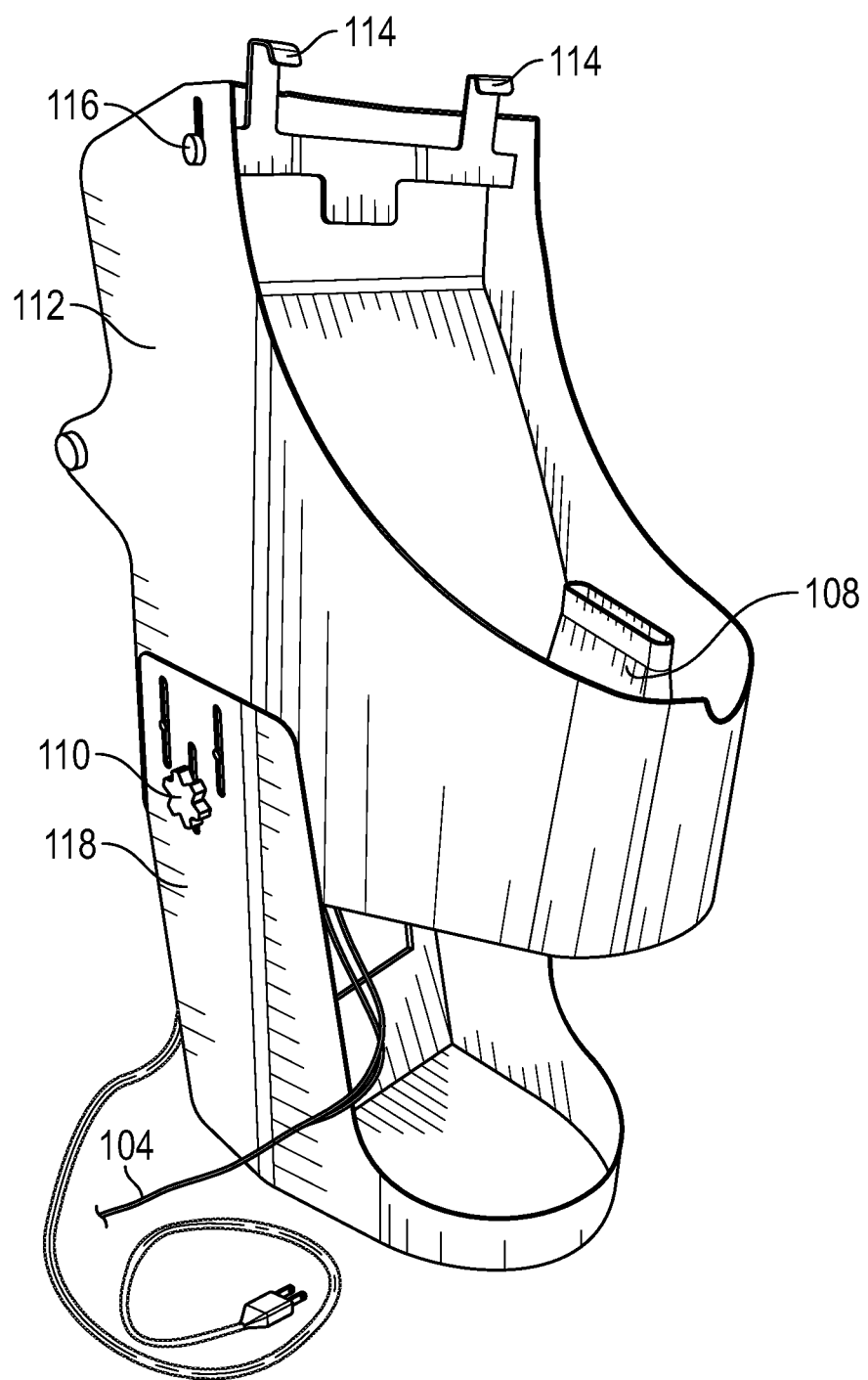
FIG. 6 is a right-side perspective view of the exemplary embodiment of a pelletized fuel delivery and combustion system of FIG. 1, shown detached from the kettle-styled charcoal grill.

FIG. 6 is a right-side perspective view of the exemplary embodiment of a pelletized fuel delivery and combustion system 100 of FIG. 1, shown detached from the kettle-styled charcoal grill 200. The body 112 of the system 100 may be curved to accommodate the exterior shape of the kettle in a kettle-styled grill 200 (not shown in FIG. 6 illustration) and, as described above, a pair of hooks 114, which may be loosened or tightened with a tightening mechanism 116, leveraged to detachably fix the system 100 to the grill kettle 210. A foot 118 may be raised or lowered via a foot adjustment mechanism 110 and, in some embodiments, may be operable to adjust the system 100 in non-vertical directions. Pelletized fuel, such as wood pellets, combusted in the firebox 120 (see FIG. 7) may generate thermal energy and smoke that exits the firebox via flue component 108 and enters space 303 defined beneath plate 300 (see previous FIG. 4). As previously described, flue component 108 may be configured to mate with and through a damper port in the kettle 210 of grill 200.

Figure 7:
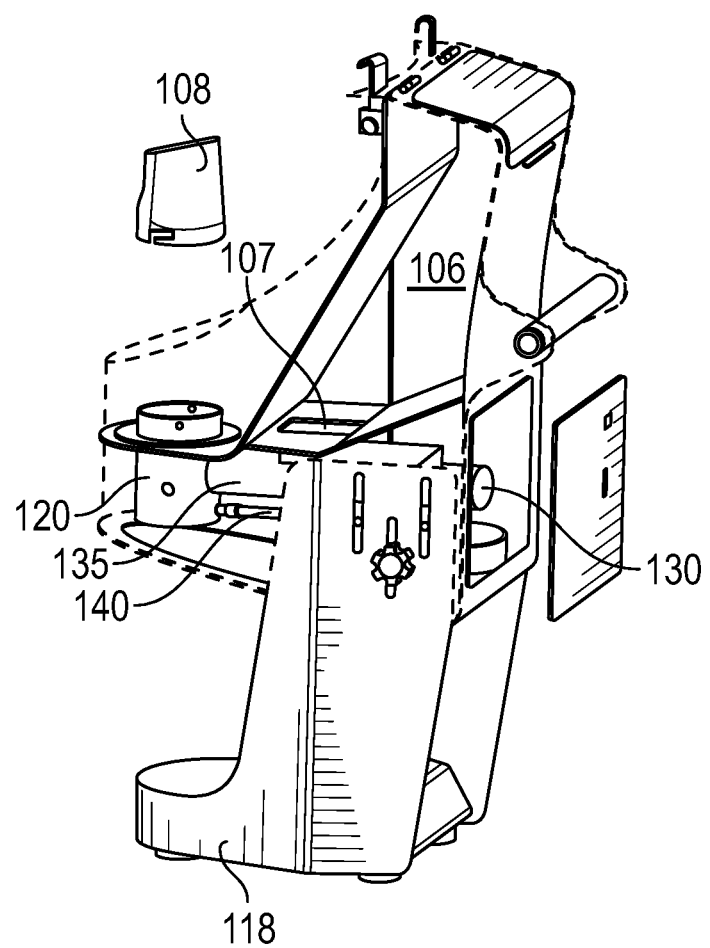
FIG. 7 is an additional view of the FIG. 6 illustration, shown with portions of the pelletized fuel delivery and combustion system transparently depicted with dashed lines to reveal internal components of the system.

FIG. 7 is an additional view of the FIG. 6 illustration, shown with portions of the body 112 of the pelletized fuel delivery and combustion system 100 transparently depicted with dashed lines to reveal internal components of the system 100. As can be clearly understood by one of ordinary skill in the art reviewing the FIG. 7 illustration, the hopper 106 is configured to store a pelletized fuel and allow a gravity-feed of the fuel through an opening 107 at the lower end of the hopper 106. It is envisioned that embodiments of the solution may also include a motorized, or in the alternative a manually actuated, agitator to dislodge any pelletized fuel that may become lodged in opening 107. The pelletized fuel may delivered through the opening 107 into a pelletized fuel delivery subsystem that comprises an auger 135 or equivalent component configured for material handling of a pelletized fuel. The auger may be driven by an electrically powered motor 130 which may be energized by a 120 Vac power source or other power source depending on embodiment. The pelletized fuel delivery subsystem may also include an electrically driven fan (not shown in the FIG. 7 illustration) for delivery of oxygen into the firebox 120. As previously described, the motor and fan, if present, may be controlled by the controller 102 such that the respective speeds of the auger and fan may be varied to precisely control thermal energy and smoke generation from combustion of the pelletized fuel.

The pelletized fuel delivery subsystem may also include a heating element 140 in communication with the firebox 120. The heating element 140, as would be understood by one of ordinary skill in the art, causes ignition of the pelletized fuel in the firebox 120. Once ignited, thermal energy generated by the combustion of pelletized fuel in the firebox 120 may be sufficient to ignite and combust subsequent fuel as it is delivered into the firebox 120 by the auger 135.

Figure 8:
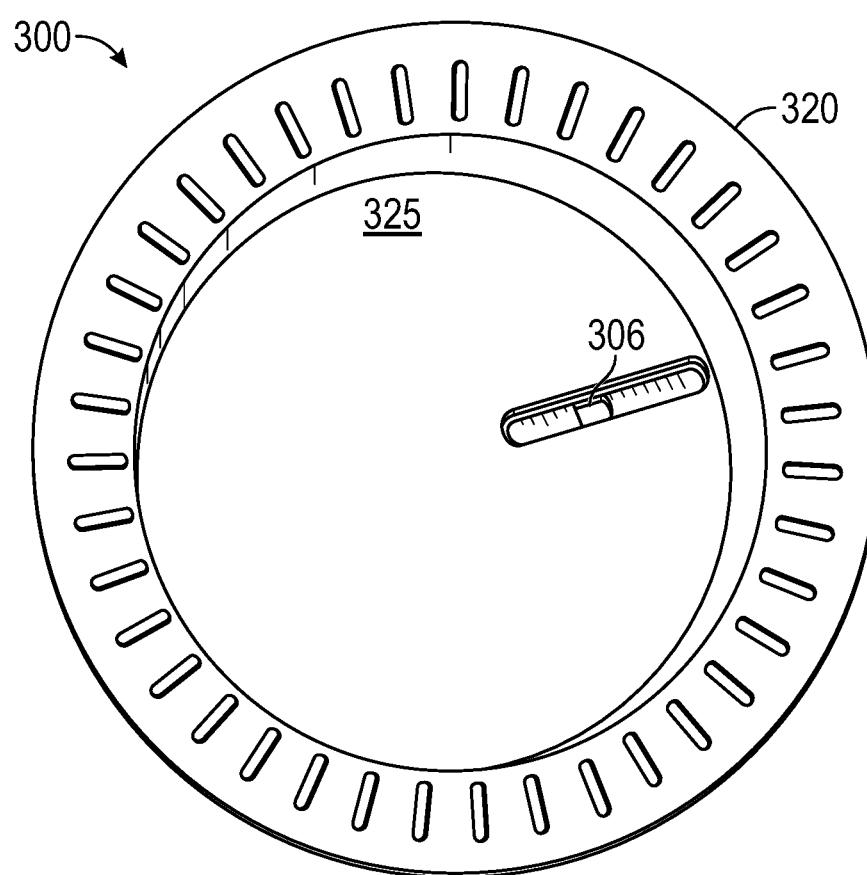
FIG. 8 is a top view of the smoke and thermal energy distribution plate seen in the FIG. 3 illustration.
Figure 9:
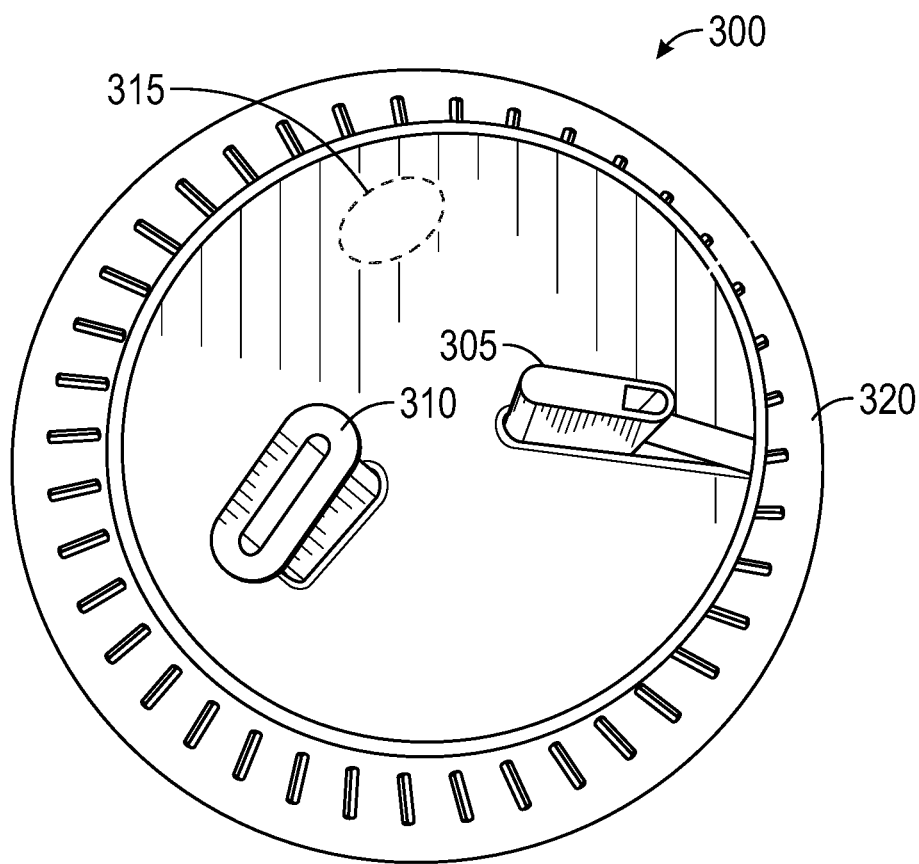
FIG. 9 is a bottom-side view of the smoke and thermal energy distribution plate seen in the FIG. 3 illustration.
Figure 10:
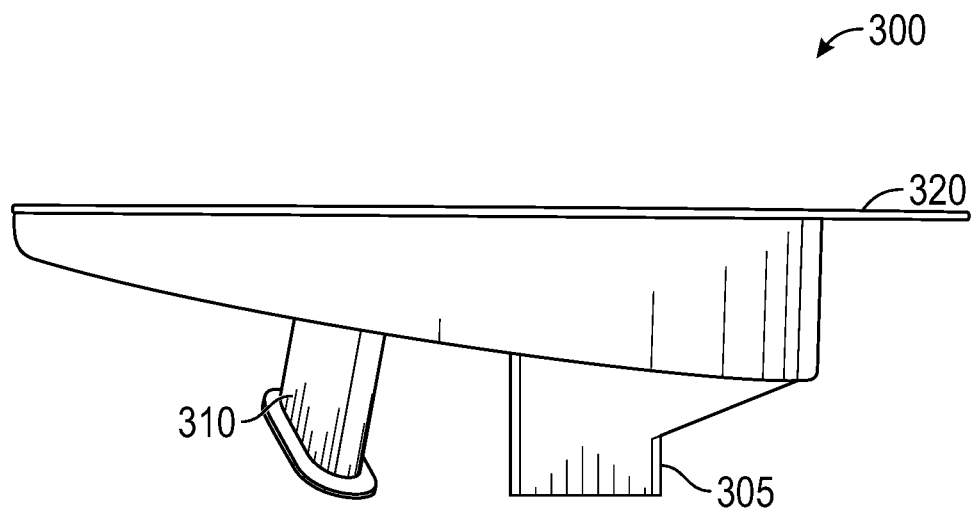
FIG. 10 is a side-view of the smoke and thermal energy distribution plate seen in the FIG. 3 illustration.

FIG. 8 is a top view of the smoke and thermal energy distribution plate 300 seen in the FIG. 3 illustration. Similarly, FIG. 9 is a bottom-side view of the smoke and thermal energy distribution plate 300 seen in the FIG. 3 illustration and FIG. 10 is a side-view of the same. Referring to the FIGS. 8-10 illustrations, the exemplary embodiment of a smoke and thermal energy distribution plate 300 will be described.

As previously explained, the smoke and thermal energy distribution plate 300 may be sized to seat within the interior of the grill kettle 210, beneath a cooking grate 220 or other cooking surface and above the bottom of the kettle 210, such that a space 303 is created. Thermal energy emanating from the firebox 120 contacts the lower surface of the smoke and thermal energy distribution plate 300 at a heat distribution area 315 that is positioned above flue component 108. The thermal energy may conduct through the plate from distribution area 315 and radiate up toward the cooking grate 220.

A foot component 310 may be positioned and configured to "plug" an unused damper hole in the bottom of the grill kettle 210. The foot component 310 may also stabilize the plate 300 when inserted into position within the grill kettle 210 such that the smoke and thermal energy distribution plate 300 is prevented from tipping or shifting out of position. Further, the interior surface 325 of the smoke and thermal energy distribution plate 300 may be slanted toward a byproduct drain 306 positioned to collect any drippings or grilling byproduct and direct such through a drain foot 305 to a catch basin (not shown) outside the grill kettle 210. Similar to the aforementioned flue component 108, the drain foot 305 may be positioned to mate with a damper hole in the kettle 210 of the grill 200.

The thermal energy and smoke distribution plate 300 may also comprise a smoke distribution lip 320. Advantageously, smoke emanating from the external firebox 120 may strike the underside of plate 300 at distribution area 315 and radiate outward toward smoke distribution lip 320. Subsequently, the smoke may transmit up and through ports in the smoke distribution lip 320 to come into contact with food placed on the cooking grate. In this way, embodiments of the solution may be used to "smoke" food in a kettle-style charcoal grill 200 with a pelletized wood fuel source being used to generate the smoke.

A pelletized fuel delivery and combustion system according to the solution has been described using detailed descriptions of embodiments thereof that are provided by way of example and are not intended to limit the scope of the disclosure. The described embodiments comprise different features, not all of which are required in all embodiments of a pelletized fuel delivery and combustion system according to the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that a pelletized fuel delivery and combustion system according to the solution is not limited by what has been particularly shown and described herein above. Rather, the scope of a pelletized fuel delivery and combustion system according to the solution is defined by the claims that follow.

What is claimed is:

1. A pelletized fuel delivery and combustion system for converting a charcoal kettle grill to a pelletized fuel grill, the system comprising:
   a firebox configured for combustion of a pelletized fuel, wherein, when the pelletized fuel delivery and combustion system for converting a charcoal kettle grill to a pelletized fuel grill is mechanically mated to a kettle of a charcoal kettle grill, the firebox is positioned outside and below the kettle;
   a pelletized fuel delivery subsystem in communication with the firebox and operable to deliver pelletized fuel to the firebox at a controlled rate via an auger;
   an electric heating element in communication with the firebox, wherein the electric heating element is operable to ignite pelletized fuel in the firebox;
   a hopper configured to store pelletized fuel and to gravitationally deliver pelletized fuel to the auger of the pelletized fuel delivery subsystem;
   a flue component in communication with the firebox, wherein, when the pelletized fuel delivery and combustion system is mated to a charcoal kettle grill kettle having a plurality of damper holes in its base, the flue component is configured to interface with at least one of the plurality of damper holes; and
   an adjustable foot component configured to adjust a height of the pelletized fuel delivery and combustion system relative to a ground level surface; and
   wherein the pelletized fuel delivery and combustion system is configured to releasably mate to the exterior of the charcoal kettle grill kettle and to interface with the ground level surface via the adjustable foot component.

2. The pelletized fuel delivery and combustion system of claim 1, further comprising a temperature sensor in electrical communication with an electronic controller configured to vary a rate of pelletized fuel delivery by the pelletized fuel delivery subsystem.

3. The pelletized fuel delivery and combustion system of claim 2, wherein the electronic controller is operable to apply a proportional-integral-derivative control algorithm.

4. The pelletized fuel delivery and combustion system of claim 1, further comprising a smoke and thermal energy distribution plate configured to reside within the interior of grill kettle, wherein when the smoke and thermal energy distribution plate is placed in the interior of the grill kettle a space is defined beneath the smoke and thermal energy distribution plate and the flue component.

5. The pelletized fuel delivery and combustion system of claim 4, wherein the smoke and thermal energy distribution plate comprises at least one foot component for stabilization.

6. The pelletized fuel delivery and combustion system of claim 5, wherein the smoke and thermal energy distribution plate comprises a slanted bottom surface and a byproduct drain located at a lower end of the slanted bottom surface.

7. The pelletized fuel delivery and combustion system of claim 4, wherein the smoke and thermal energy distribution plate comprises a plurality of slits positioned for distributing smoke from the space beneath the smoke and thermal energy distribution plate.

* * * * *